Patented Oct. 21, 1952

2,614,959

UNITED STATES PATENT OFFICE 2,614,959

FERRIC SALT OF MERCAPTOBENZOTHIAZOLE AND ZINC DIMETHYL DITHIOCARBAMATE FUNGICIDAL COMPOSITION

Albert A. Somerville, Carmel, N. Y., assignor to R. T. Vanderbilt Co., Incorporated, New York, N. Y., a corporation of New York No Drawing. Application March 28, 1949, Serial No. 84,005

1 Claim. (Cl. 167—22)

This invention relates to compositions of matter which are useful as fungicides.

It is known in the art that zinc dimethyl dithiocarbamate possesses useful fungicidal properties, and it is the object of the present inventions, and it is to provide new compositions of matter having such properties and containing such dithiocarbamate and another material. The new compositions posses enhanced utility in that they possess fungicidal properties greater than those which would be expected from the properties of the constituents of such compositions.

The aforementioned object is accomplished in accordance with the present invention by providing a composition having utility as a fungicide and containing as its active ingredients zinc dimethyl dithiocarbamate, a compound having the structural formula

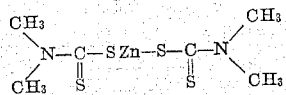

and the ferric salt of mercaptobenzothiozole, a material which can be formed by reacting in aqueous solution substantially three moles of at least one alkali metal salt (e. g., the sodium salt) of mercaptobenzothiazole and one mole of at least one water-soluble ferric salt (e. g., ferric sulfate, chloride or nitrate).

Zinc dimethyl dithiocarbamate may be prepared by procedures which are well understood, for example, by reacting in aqueous solution a suitable alkali metal dimethyl dithiocarbamate (e. g.

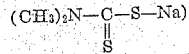

with a water-soluble zinc salt (e. g., zinc chloride, zinc nitrate or zinc sulfate) to precipitate the zinc dimethyl dithiocarbamate.

The ferric salt of mercaptobenzothiazole used in preparing the composition of the present invention may be prepared using a wide range of reaction temperatures (e. g., 5–100° C.), but there is no advantage in using any temperature other than room temperature (20–25° C.). Also, although a wide range of relative proportions of the reactants may be used, it is preferred to use a slight excess (e. g., 5–10%) of the water-soluble ferric salt. The amount of water used as a solvent in preparing the ferric salt of mercaptobenzothiazole may also be varied widely, two to eight liters of water being preferably used per mole of water-soluble ferric salt. For example, in preparing ferric salt of mercaptobenzothiazole, a solution of one mole of the water-soluble ferric salt in one to four liters of water may simply be admixed at room temperature with a solution of three moles of the sodium salt of mercaptobenzothiazole in one to four liters of water.

In comparing the fungicidal effectiveness of the mixtures of the present invention with the effectiveness of the separate active ingredients thereof, there was used a method which has been found to be easily reproduced, which gives relatively constant results without involving cumbersome techniques, and which has been applied to a number of fungi with equal efficiencies demonstrated.

The method consisted of a test tube dilution, using a nutrient salt solution (composed of 40 grams of dextrose, 2 grams of asparagine, 0.5 gram of potassium dihydrogen phosphate, 0.25 gram of $MgSO_4 \cdot 7H_2O$, 0.0003 gram of thiamine chloride and 1,000 ml. of distilled water), a spore suspension of *Aspergillus niger* (made from mature, healthy culture tubes by washing a given tube with four aliquots of 5 ml. of distilled water and thereafter diluting the washings with distilled water to a total of 200 ml.) and a solution of the protectant (fungicide).

The dilution test was performed by first adding to a test tube 1 ml. of the nutrient solution, after which 3.50 ml. of the spore suspension was added and the mixture was agitated. The protectant was solubilized in a minimum amount of a suitable non-reactive solvent (water or a mixture of water and acetone) suspended where necessary by constant agitation. In testing the effectiveness of various protectants, varying amounts thereof were added to a given test tube containing the 1 ml. of nutrient solution and the 3.50 ml. of the spore suspension, the final volume of the mixture of nutrient solution, spore suspension and protectant solution in a given test tube being 5 ml. The test tube containing the 5 ml. total mixture was then agitated to attain homogeneity, and by means of a 1 ml. pipette (graduated in $\frac{1}{100}$ ml. subdivisions) drops of the mixture were placed on chemically cleaned microscope slides in triplicate.

These slides were placed in large Petri dishes (150 mm. x 20 mm.) containing a quantity of distilled water and a glass rod support which held the slides above the surface of the water. Petri dish covers were placed on the dishes and the spores were then incubated for 48 hours at 30 ± 1° C. The presence of the water in the Petri dishes assured high humidity, thereby preventing the test solutions from drying. At the end of the incubation period, the slides were removed from the Petri dishes and were examined microscopically for signs of germination of the spores. Where no spores had germinated, the protectant at the concentration employed was considered to be completely fungicidal or fungistatic.

The following table contains data obtained using the method just described, the data concerning the relative fungicidal activities of various compositions falling within the scope of the present invention with the effectiveness of zinc dimethyl dithiocarbamate and the ferric salt of mercaptobenzothiazole:

| Active Fungicidal Ingredients | | Minimum p. p. m. of active ingredients for zero germination in dilution test |
|---|---|---|
| Weight percent zinc dimethyldithio- carbamate | Weight percent ferric salt of mercapto- benzothiazole | |
| 0 | 100 | 500 |
| 1 | 99 | 500 |
| 5 | 95 | 50 |
| 10 | 90 | 50 |
| 25 | 75 | 10 |
| 50 | 50 | 5 |
| 75 | 25 | 3 |
| 90 | 10 | 5 |
| 95 | 5 | 3 |
| 99 | 1 | 3 |
| 100 | 0 | 20 |

The preceding table illustrates various compositions falling within the scope of the present invention, such compositions being prepared from zinc dimethyl dithiocarbamate and the ferric salt of mercaptobenzothiazole.

As is shown by the data contained in the table, the relative proportions of the active ingredients contained in the fungicidal composition may be varied widely, nevertheless producing mixtures characterized by advantageous properties. However, the composition should contain not more than about 80% by weight of the ferric salt of mercaptobenzothiazole, based upon the weight of that material and the zinc dimethyl dithiocarbamate contained in the mixture. Moreover, it is preferred that the composition contain not more than about 25% by weight of the ferric salt of mercaptobenzothiazole, based upon the weight of active ingredients contained in the composition.

The mixtures of the present invention are not restricted in their advantage to the prevention of growth of *Aspergillus niger*. Thus, they have also been used to advantage in preventing the germination of species of Trichoderma and Penicillium.

The composition of the present invention may conveniently be used in the form of a conventional agricultural fungicide spray, for example, suspended in water. Also, the composition may be used in the form of a dust prepared, for example, by first preparing an intimate mixture of the active ingredients and thereafter admixing such mixture with a conventional inert, solid diluent, such as lime, bentonite, talc, pyrophyllite, gypsum, chalk, silica, etc.

I claim:

A composition of matter suitable for use as a fungicide, the active fungicidal ingredients of such composition comprising the ferric salt of mercaptobenzothiazole and zinc dimethyl dithiocarbamate, the said ferric salt and said zinc dimethyl dithiocarbamate being present in such proportions that the weight of the ferric salt is within the range from 1 to 25 per cent, based upon the weight of the ferric salt and zinc dimethyl dithiocarbamate.

ALBERT A. SOMERVILLE.

REFERENCES CITED

The following references are of record in the file of this patent:

UNITED STATES PATENTS

| Number | Name | Date |
|---|---|---|
| 1,962,109 | Alvord | June 5, 1934 |
| 1,972,961 | Tisdale | Sept. 11, 1934 |

OTHER REFERENCES

Goldsworthy et al.: J. Agr. Res., vol. 66, No. 7, pages 277 to 291, April 1, 1943.